May 18, 1937.   N. J. SEIBERT ET AL   2,081,072
METER VALVE
Filed April 16, 1935

INVENTORS.
Nelson J. Seibert,
Frank S. Brooks.
BY
Strauch & Hoffman
ATTORNEYS

Patented May 18, 1937

2,081,072

UNITED STATES PATENT OFFICE 2,081,072

METER VALVE

Nelson J. Seibert, Wilkinsburg, and Frank S. Brooks, Edgewood, Pa., assignors to Pittsburgh Equitable Meter Company, Pittsburgh, Pa., a corporation of Pennsylvania Application April 16, 1935, Serial No. 16,698

6 Claims. (Cl. 73—239)

This invention relates to improvements in fluid meters, and more particularly to improvements in the rotary valves employed in positive displacement meters, and is an improvement on the construction shown in United States Patent No. 1,986,747, issued January 1, 1935, to Walter H. Parker.

Where a meter of this type is subjected to a variable flow, for example, on a gasoline dispensing pump, the differential pressure across the valve of the meter may vary with the rate of flow, and is greatest when the rate of flow is at the maximum. In this type of dispensing equipment, there is usually a valve located in the nozzle of the delivery line, and delivery of liquid through the meter does not begin until this valve is opened by the operator. At the moment of opening the delivery valve the pressure at the outlet of the meter becomes practically zero whereas the full pressure of the pump is exerted at the inlet of the meter, with the result that the differential pressure across the valve of the meter may become so great as to wedge or lock the valve into place thereby causing stoppage or inaccurate measurement by the meter.

According to the present invention the valve is divided into two or more separately movable parts, the differential pressure of the fluid being exerted independently on each of the parts. One part of the valve has a seating surface which is held in contact with the valve seat by the differential pressure of the fluid, and the other part is supported on a bearing having relatively small friction. The excess of differential pressure over that needed to seat the valve is carried by the non-seated valve portion.

In a specific preferred embodiment of our invention, the two parts of the valve are independently axially movable with a positive driving connection therebetween, and a suitable flexible diaphragm seals the parts in fluid tight relation. One portion of the valve rests upon the valve seat, and the other portion is supported on a central self lubricated bearing so that the overall resistance to turning is considerably reduced.

Accordingly, it is an object of the present invention to provide a meter having a valve the seat of which is relieved of the excess of the differential pressure to avoid locking and inaccuracies of the meter.

A further object is the provision of a valve which is relatively simple in construction, inexpensive to manufacture, and will have a relatively long life.

These and other objects of the present invention will be understood upon consideration of the following description taken in connection with the drawing in which.

Figures 1, 2:
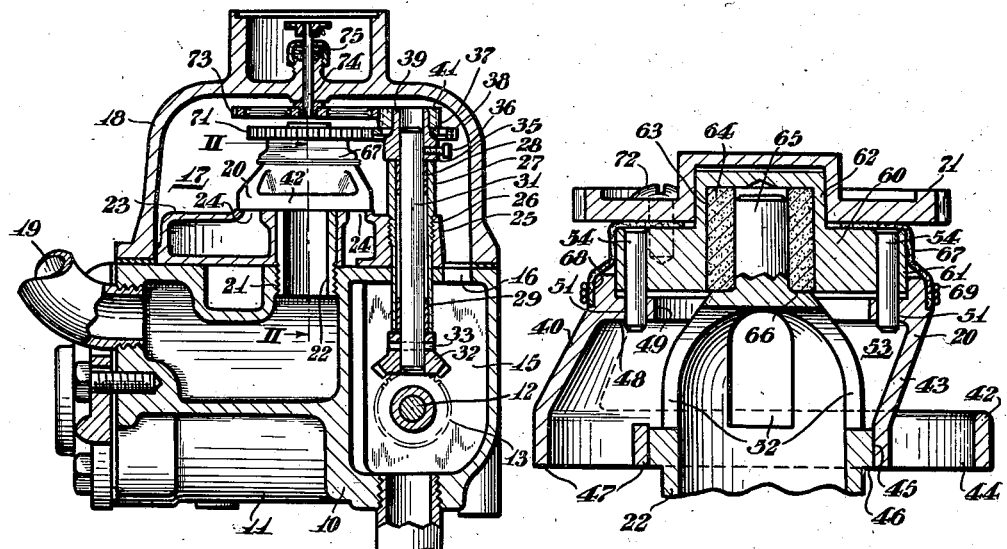
Figure 1 is a vertical section taken through a meter illustrating an embodiment of the invention, the valve being shown in elevation.
Figure 2 is a fragmentary vertical section through the valve taken on line II—II of Figure 1.

Referring to the drawing, Figure 1, there is shown a meter casing 10 which has two parallel horizontal cylinders formed therein, only one cylinder 11 being shown. Pistons (not shown) operate in each cylinder 11 and through a suitable crank and connecting rod (not shown) rotate a crank shaft 12 having a bevel gear 13 thereon. The liquid to be measured is introduced through inlet 14 into a suitable chamber 15 through which the crank shaft 12 projects, and from thence through passage 16 enters into the space 17 formed between the casing 10 and a cover 18 provided thereon. An outlet 19 is provided for discharge of measured liquid from the meter, the operation of the pistons for measuring the liquid being suitably controlled by a valve member designated generally by numeral 20.

The valve casing 10 has a central threaded bore 21 therein in which is threadedly secured a hollow sleeve 22, and a valve seat member 23 is fitted around the tube 22 and is suitably secured to the casing by screws (not shown) or other suitable means. The valve seat member 23 has a raised portion on its upper face accurately machined and ground to form a plane valve seat, and has a series of ports 24 therein disposed at intervals about the circumference. These ports serve as inlets to the ends of the cylinders on the intake stroke of the pistons, and as outlets from the cylinders on the exhaust stroke. The valve seat member 23 carries an extension 25 having a threaded bore 26 therein in which is threadedly secured a tubular housing 27. This housing carries bushings 28 and 29 at its ends which serve as journals for the register and valve drive shaft 31 extending through chamber 15. At its lower end the valve shaft 31 has a bevel gear 32 suitably secured thereto, as by a pin 33, which meshes with the similar bevel gear 13 similarly secured on the crank shaft 12, and is driven thereby. At its upper end the valve drive shaft 31 carries a collar 35 secured thereto by any suitable means, as for example by set screw 36, the collar serving to limit the end play of the shaft 31 in the sleeve 27, and it has a step portion 37 to receive a suitable driving ring gear 38 thereon for driving the valve 20, and a reduced portion 39 to receive a register driving gear 41.

The valve 20, shown in vertical section in Figure 2, comprises a lower inverted cup shaped portion designated generally, by the numeral 40 with an outer rim 42, the wall of the cup being receded as indicated at 43 for a portion of the circumference to provide a valve inlet opening 44. The lower part 40 of the valve has a suitable internal bearing face 45 which is journalled about the bearing flange 46 on the tubular member 22, and provides valve faces 47 which bear on the ground valve seat of the seat member 23. An internal flange or shoulder 48 is formed at the top with a central opening 49 therein, and a plurality of holes 51 are formed in this flange. The tubular member 22 has a plurality of openings 52 at its top which communicate with the interior 53 of valve 20 and provide an exhaust outlet therefrom.

The upper portion of the valve 29 indicated generally by the numeral 60 comprises a disk 61 having a hub 62 thereon, the disk and hub being bored as indicated at 63 to receive a suitable bushing 64 therein which preferably is formed of oilless bearing material. The upper portion 60 of the valve forms a driving connection with the lower portion 40 of the valve member by means of the pins 54 which are suitably secured in fluid tight relation in disk 61 and are longitudinally slidable in the bores 51 formed in the upper internal flange 48 of the lower valve member. Tubular member 22 has a reduced portion 65 at the top which fits into bushing 64, and through the lower end of bearing 64 the top portion 60 of the valve rests on a shoulder 66 formed on said tubular member. The upper portion 60 of the valve is thus supported on shoulder 66 and bushing 64 to allow it to move axially to take up wear on the shoulder 66 or the end of the bushing.

A diaphragm 67 of leather or other suitable material surrounds a reduced extension 68 of the lower portion 40 of the valve member and is tied in place in fluid tight relation by silk threads 69 or in any other suitable manner. The diaphragm 67 is extended across the top of the disk 61 and is secured thereto by the ring gear 71 which is removably held in place on the disk by machine screw 72 or any other suitable means. The ring gear 71 meshes with the valve driver gear 38 and it will be apparent from the foregoing description that the valve is rotated in synchronism with operation of the pistons to supply and exhaust fluid to and from the cylinders in proper sequence. The pinion ring 41 on the collar 35 meshes with a register driving gear 73 on a shaft 74 which passes through a stuffing box 75 in the cover.

The operation of the invention now will be described. Fluid to be measured enters inlet 14 and is conducted to chamber 17 surrounding the valve 20. Fluid passes through the opening 44 of the valve into the proper inlet ports in the valve seat member as the valve rotates, and is conducted to the ends of the cylinders to operate the pistons, the exhaust from the other cylinders being conducted to the interior 53 of valve 20 and passes through the holes 52 in the sleeve 22 to be discharged from the meter at the outlet 19. The valve shaft 31 is rotated from crank shaft 12 and the driving gear 38 at the top drives the valve 20 through meshing gear 71 thereon. It will be seen that the lower part 40 of the valve is positively driven from the upper part 60 by means of the pins 54 engaging the holes 51 in the lower member, and the diaphragm 67 provides a fluid tight connection between the upper portion 60 and lower portion 40 of the valve which permits independent axial movement of the upper portion relative to the lower portion. A part of the differential pressure is exerted on the upper portion 60 of the valve which is carried by the shoulder 66 and which is self lubricated, and a part of the differential pressure is exerted on the lower portion 40 of the valve which has the ground seating face 47. Preferably, the effective area of the lower portion is such that the pressure exerted thereon is sufficient to hold the valve seated.

Figure 3:
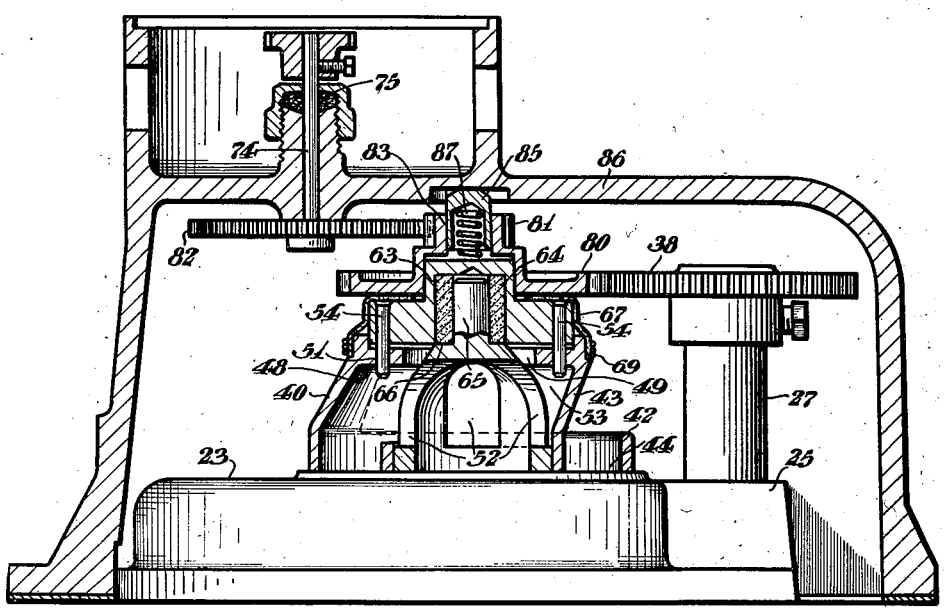
Figure 3 is a vertical section of a preferred embodiment of the invention.

In the modification shown in Figures 1 and 2 just described the register driving gear and valve are directly driven from the valve drive shaft. In Figure 3 there is shown a modification wherein the register is driven through the valve. In this modification, wherein like numerals designate like parts, the diaphragm 67 is clamped to the upper portion 60 by a gear 80 having an integral pinion 81 thereon adapted to register with a gear 82 to drive the register (not shown). The pinion 81 is bored as indicated at 83, and receives a cylindrical plunger 85 therein which is axially movable and is urged outward against the cover 86 by a suitable spring 87. The spring 87 does not prevent free axial movement of the upper portion 60 to take up wear on the shoulder 66 or the bushing.

In this modification the valve is driven through the intermeshing gears 38 and 80, and the register is driven from the valve by the intermeshing gears 81 and 82. The spring 87 constantly urges the upper valve portion 60, which carries the gear 80, downward so that the gears 38 and 80 remain in mesh during shipment of the meter and during its operation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In a fluid meter, a meter casing, a rotary valve, a cover enclosing said valve and secured to said casing, said valve comprising a lower portion having a valve seating surface, and an upper portion supported independently thereof and forming a positive driving connection therewith, means providing a fluid tight connection between said portions, a gear mounted on the upper portion of the valve, a valve driving shaft having a gear meshing therewith, and means coacting between said cover and said valve to prevent displacement of said gear.

2. In a meter, a valve seat and a rotary valve cooperating with said seat, said valve comprising an inverted cup shaped member provided with valve ports and passages and a driving member rotatably supported independently of said cup shaped member, said cup shaped member being axially movable with respect to said driving member, a driving connection between said members, a gear carried by said driving member, means to drive said gear, and a flexible diaphragm connected to said cup shaped member and clamped between said driving member and said gear.

3. In a fluid meter, a valve seat; a rotary valve comprising a lower portion on said seat having valve seating surfaces and ports therethrough; an upper portion supported independently of said lower portion; means to form a substantially frictionless driving connection between said upper portion and said lower portion permitting free axial movement of said lower portion; and means forming a fluid tight connection between said portions.

4. In a meter, a valve seat; a valve having a portion with a valve seating surface and ports therethrough resting on said seat; a second portion supported independently of said first portion; means to form a substantially frictionless driving connection between said portions permitting free axial movement of said lower portion; and a diaphragm forming a fluid tight connection between said portions.

5. In a fluid meter, a valve seat and a rotary valve portion cooperating with said seat and having an opening therethrough, a second portion closing said opening and a flexible sealing connection connected to said first portion and said second portion, said second portion being supported independently of said first portion, a plurality of spaced apertures in said first portion, a plurality of driving pins secured to said independently supported portion and slidably engaged in said apertures, and means to drive said second portion.

6. In a fluid meter, a valve seat; a rotary valve comprising a lower portion on said seat having valve seating surfaces and ports therethrough; an upper portion, a support for supporting said upper portion independently of said lower portion; means to form a substantially frictionless driving connection between said upper portion and said lower portion permitting free axial movement of said lower portion; the support for the upper portion permitting free axial movement of said upper portion; and means forming a fluid tight connection between said portions.

NELSON J. SEIBERT.
FRANK S. BROOKS.